(12) United States Patent
Damgaard Jensen

(10) Patent No.: US 10,072,410 B2
(45) Date of Patent: Sep. 11, 2018

(54) COMBINED NON-RETURN VALVE AND RAT KILLER

(71) Applicant: Karen Elisabeth Damgaard Jensen, Laval, Quebec (CA)

(72) Inventor: Karl Johan Damgaard Jensen, Odense (DK)

(73) Assignee: Karen Elisabeth Damgaard Jensen (CA)

( * ) Notice: Subject to any disclaimer, the term of this patent is extended or adjusted under 35 U.S.C. 154(b) by 0 days.

(21) Appl. No.: 15/555,435

(22) PCT Filed: Mar. 2, 2016

(86) PCT No.: PCT/DK2016/000007
§ 371 (c)(1),
(2) Date: Sep. 1, 2017

(87) PCT Pub. No.: WO2016/138902
PCT Pub. Date: Sep. 9, 2016

(65) Prior Publication Data
US 2018/0038092 A1   Feb. 8, 2018

(30) Foreign Application Priority Data
Mar. 3, 2015   (DK) .................. 2015 00121

(51) Int. Cl.
*A01M 31/00*    (2006.01)
*E03F 7/06*     (2006.01)
(Continued)

(52) U.S. Cl.
CPC ............... *E03F 7/06* (2013.01); *A01M 27/00* (2013.01); *A01M 31/002* (2013.01); *E03F 7/04* (2013.01)

(58) Field of Classification Search
CPC ........... E03F 7/06; E03F 7/04; A01M 31/002; A01M 27/00; Y10T 137/7898; Y10T 137/79; Y10T 137/7902; Y10T 137/7903
(Continued)

(56) References Cited

U.S. PATENT DOCUMENTS 1,327,278 A    1/1920  Holman
7,240,378 B2 *  7/2007  Long ...................... A01M 29/30
                                                    137/527
(Continued)

FOREIGN PATENT DOCUMENTS

CA    2818947 A1 *  5/2012  ................ E03F 7/04
DE    19757743      2/1999
(Continued)

OTHER PUBLICATIONS

International Search Report Application No. PCT/DK2016/000007 Completed: Jun. 8, 2016; dated Jun. 17, 2016 2 pages.

*Primary Examiner* — Eric Keasel
(74) *Attorney, Agent, or Firm* — Ware, Fressola, Maguire & Barber LLP

(57) ABSTRACT

Device in the form of a combined non-return valve and rat killer for internal fitting in a sewer pipe comprising a valve (2), which can swing between an open and a closed position, the valve (2) being able to serve as a seal against possible back-flow (B) and also as a rat killer. The valve (2) is fitted with a projection (2a) on its inner side near its lower end and when swinging down, the blow-impact of the valve with the rat (12) can kill it. The valve (2) is operated by an actuator (7), preferably in the form of a voice-coil linear motor, which is controlled by sensors in the sewer pipe. Due to a continuous flow (A) through the sewer pipe, the device will remain clean and thus functional.

8 Claims, 4 Drawing Sheets

(51) Int. Cl.
*A01M 27/00* (2006.01)
*E03F 7/04* (2006.01)

(58) Field of Classification Search
USPC ............... 137/527, 527.2, 527.8, 527.6, 560
See application file for complete search history.

(56) References Cited

U.S. PATENT DOCUMENTS

| | | | |
|---|---|---|---|
| 8,459,298 B1* | 6/2013 | Valdez | F16K 15/03 137/315.16 |
| 9,863,134 B2* | 1/2018 | Coscarella | E03F 7/04 |
| 2018/0044906 A1* | 2/2018 | McAlpine | E03F 7/06 |

FOREIGN PATENT DOCUMENTS

| | | |
|---|---|---|
| FR | 1595231 | 6/1970 |
| WO | 2006105983 | 10/2006 |

* cited by examiner

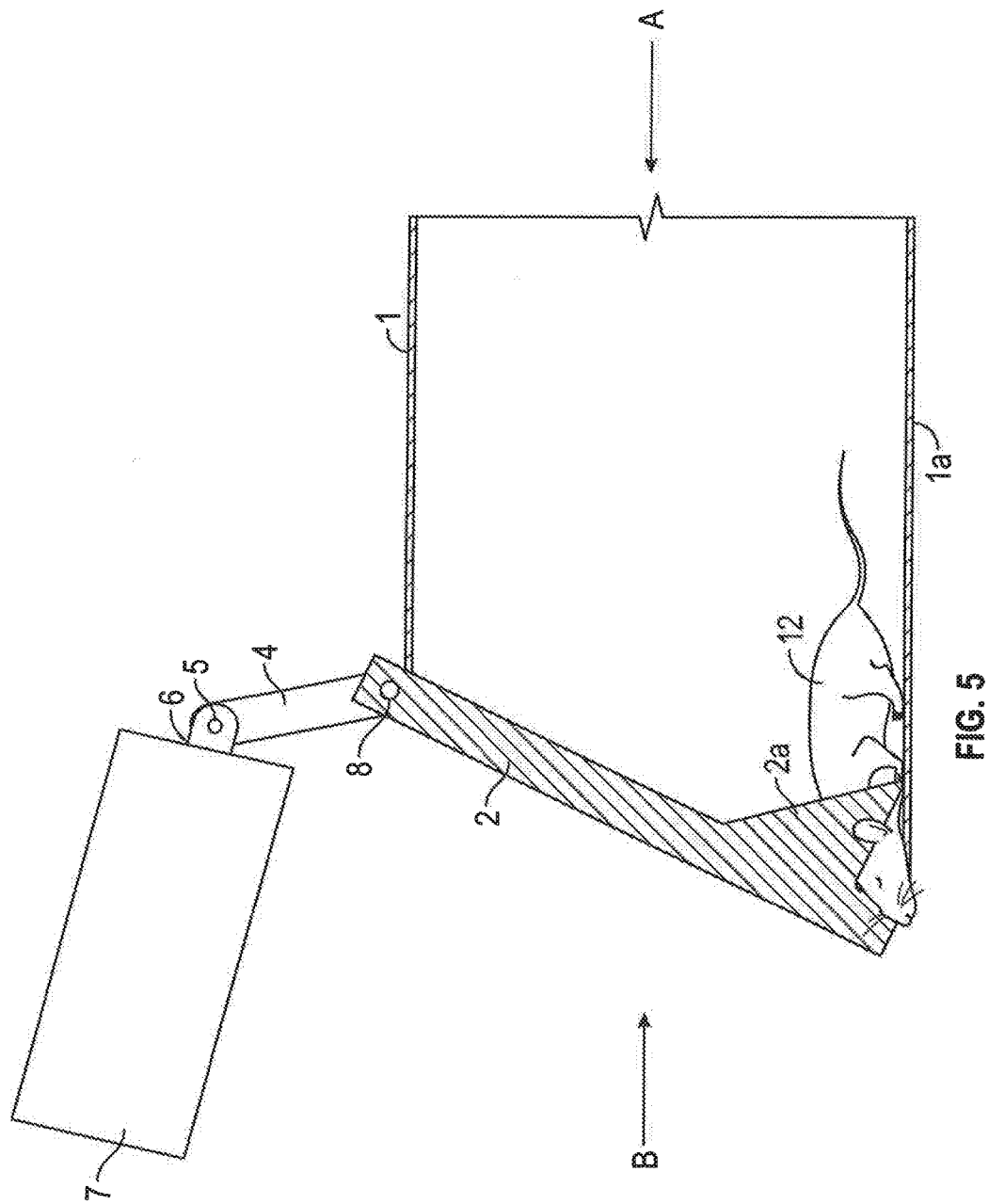

COMBINED NON-RETURN VALVE AND RAT KILLER

BACKGROUND OF THE INVENTION

The invention relates to a device in the form of a combined non-return valve and rat killer for internal fitting in a piping system such as a sewer pipe, where the device comprises a swinging valve, which in a passive position is open for continuous flow through the pipe and in active position is in a down-swung position, where the valve blocks back-flow.

Along with increased volumes of rainwater, which are characterized by large amounts over a short period of time, the problem of overloaded sewer pipes and resulting damages and nuisance to buildings and surrounding grounds, such as roads and the like, is increasing.

For drainage of this so-called flood and/or back-flow, valve-like devices are known which include, for example, spherical floating bodies, which in the event of rising water will move upwards toward a valve seat in the drain. Most commonly used is a non-return flap where the flap follows the flow of water. All parts are in direct contact with sewage and therefore exposed to deposits which will eventually lead to problems such as lower flow and problems with leakage. This is being remedied with annual inspections and possible cleaning, and will after a few years be inoperative, because the amount of dirt deposited on the flap will cause the flap to malfunction and leak.

Over the years attempts have been made to limit the number of sewer rats using electrical or mechanical traps and poison but so far without satisfactory results, either because the water flow through the pipe or the sewer pipe is reduced or due to inaccuracy when serving as a rat killer.

SUMMARY OF THE INVENTION

The objective of the invention is to remedy these shortcomings and inconveniences in known non-return valves and rat traps and this is achieved according to the invention by a valve pivoted at the top of the pipe and connected to an actuator with a reciprocating maneuver rod for swinging the valve between an open and a closed position.

In this surprisingly simple way the valve will serve as a closing valve, which in normal mode, will be raised for free flow through the pipe and in the event of back-flow will be pressed against the pipe wall and thus block the back-flow while, at the same time, a rat will be killed by the valve when it with great speed and force is swung down against the lower wall of the Pipe.

As the valve will normally be in an open, i.e. up-swung position, any dirt will be washed away ensuring the function as valve, and there will be a close seal of the back-flow as the water presses against the valve and thereby presses it against the pipe wall and thereby ensures that it is tightly sealed.

For swinging of the valve is used an actuator, which can be activated momentarily, allowing the valve to serve as a rat trap as the lower edge of the valve will be able to break the neck/back of a rat when it is located under the valve.

By providing the valve with a sharp projection at the edge, a rat positioned at the valve's place of impact will be caught and killed by said projection when it strikes the neck/back of the rat.

By providing the valve with an encircling seal is in part a closely sealed non-return valve, and in part a shock-absorbing impact against the end of the pipe ensured.

By applying an electric voice-coil linear motor to move the valve, it will be possible to move the valve with great speed and force as well as to set it to variable motion speed and perhaps even a vibrating motion, which will lead to an even more efficient killing due to the frequent, repeated blows.

By controlling the actuator using sensors it is ensured that the valve is swung down exactly when the rat is located below the valve's place of impact thereby achieving high accuracy of impact and a rapid and humane killing of the rat.

By controlling the valve's swinging motion so that it is at first moved slowly when a rat approaches the trap and then, once the rat is in kill position, it will strike the rat's neck/back with great speed.

By ensuring that the valve is released from the actuator in case of power failure the valve will be free to serve as a nonreturn valve.

Finally, it is advisable that the valve after each down-swing is swung up for free passage to ensure free flow and thus removal of the dead rat.

BRIEF DESCRIPTION OF THE DRAWINGS

Examples of embodiments will according to the invention be described in detail in the following with reference to the drawing where FIGS. 4 and 5 show this serving as a rat killer.

DETAILED DESCRIPTION

Figure 1:
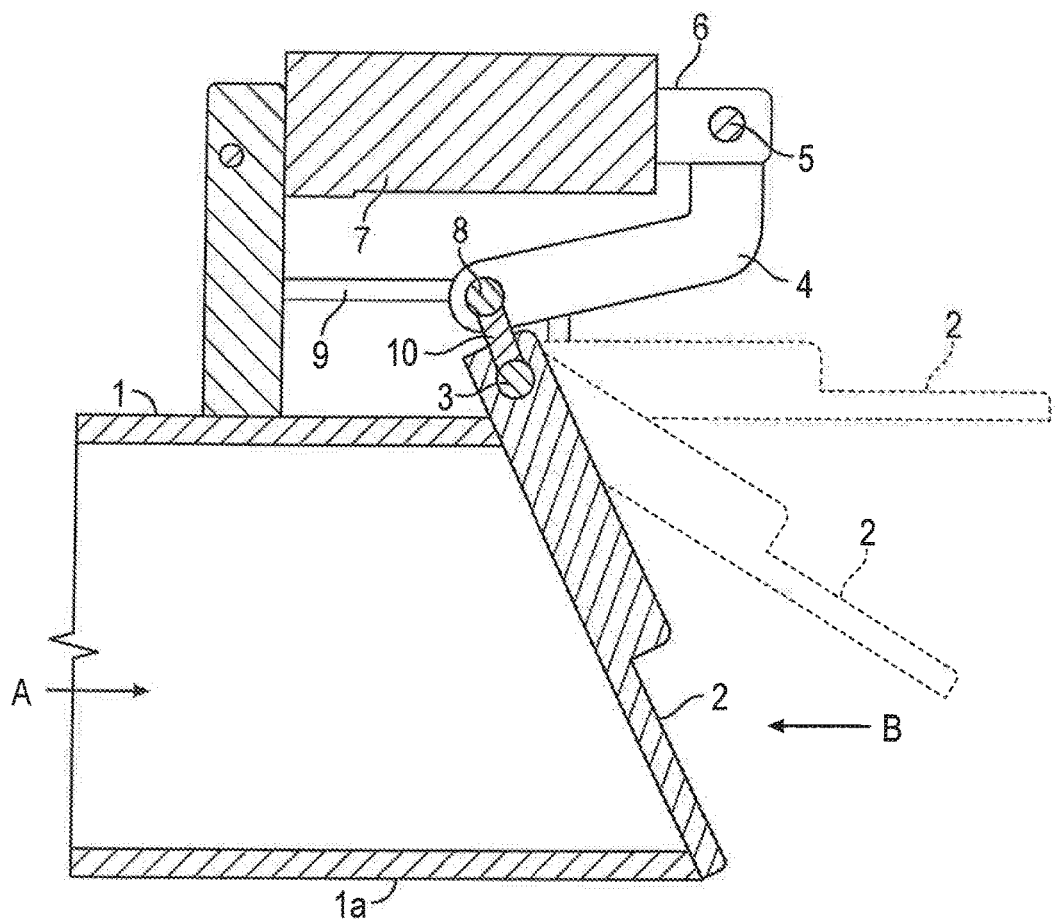
FIG. 1 shows a sectional drawing of a first embodiment of the device.

FIG. 1 shows a non-return valve mounted on a pipe 1, 1a and where a valve 2 serves as a seal in the event of back-flow B through the pipe.

For movement of the valve 2, there is on top of the pipe 1 mounted an actuator 7 with a maneuver rod 6, which is movable in a longitudinal direction.

To the rod 6 is mounted 5 an arm 4, which again is mounted 8 to a stationary arm 9.

To the arm 4 is attached an additional arm 10, which is attached to the valve 2 in a fitting aperture 3.

By activating the actuator 7 the valve 2 will thus be able to swing from the punctured open position to the closed position where the water in the flow direction B will be blocked. This is done by the valve 2 abutting the bottom/end of the pipe.

Figure 2:
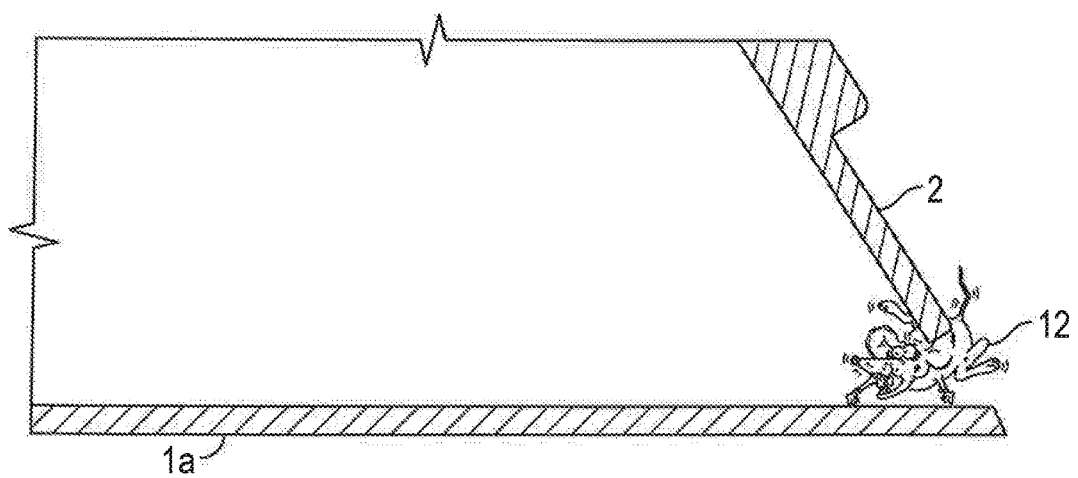
FIG. 2 shows a section of the valve in its function as a rat killer.

FIG. 2 shows a section of the valve 2 functioning to kill a rat 12.

Figure 3:
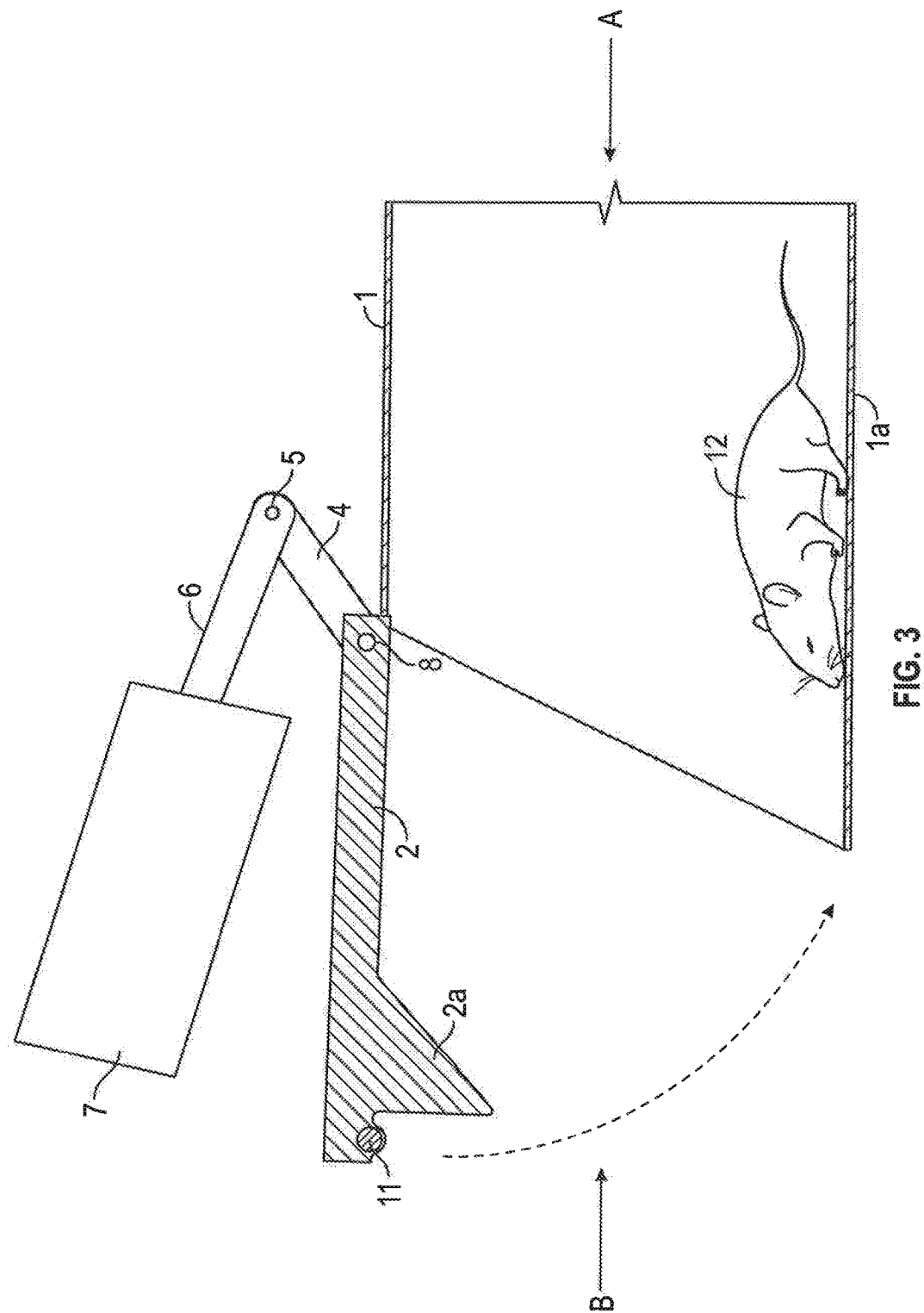
FIG. 3 shows a sectional drawing of a second embodiment.
Figure 4:
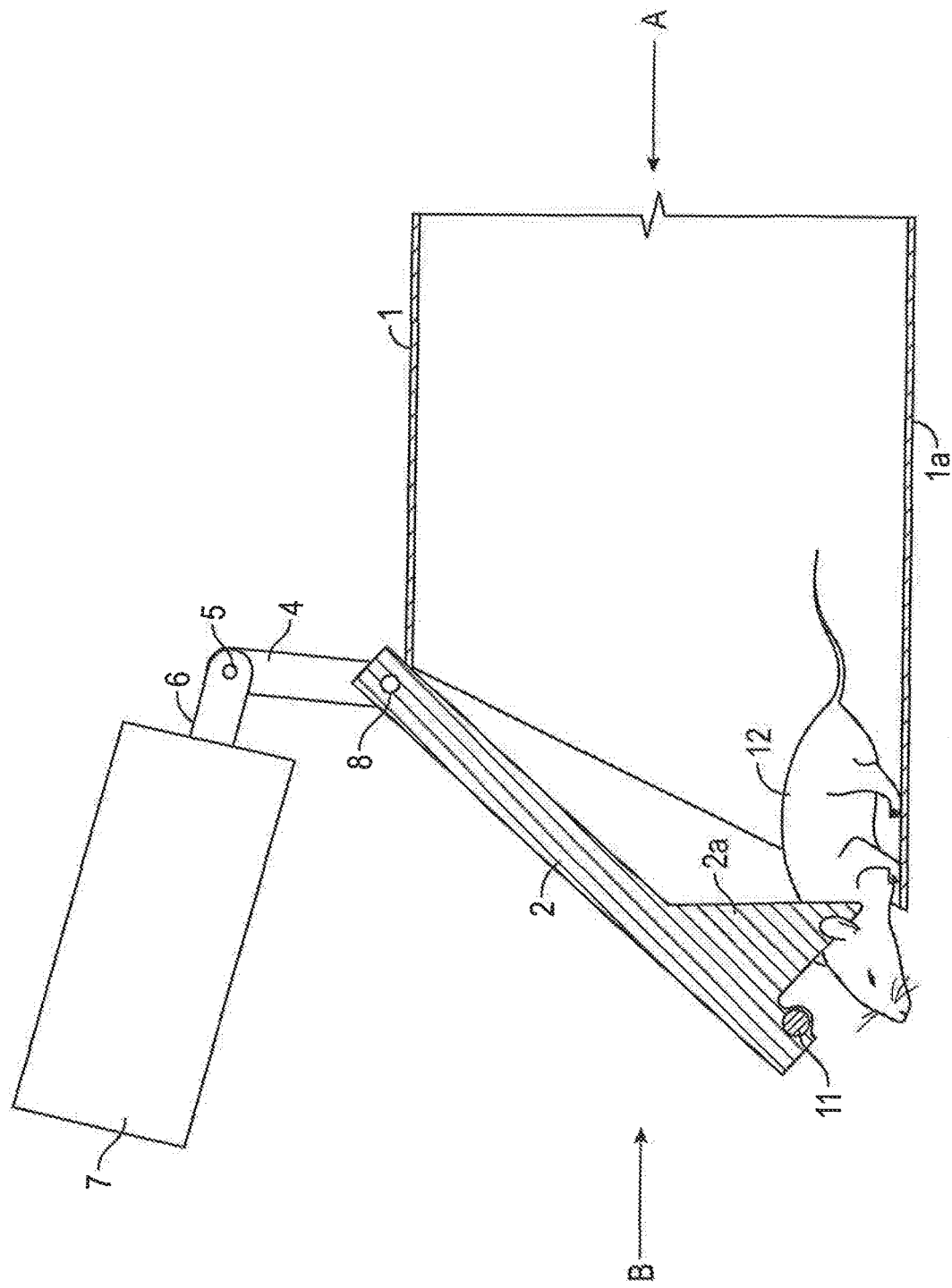

Another embodiment is shown in FIGS. 3-5. This comprises an actuator 7, which is mounted on top of the pipe 1. The motion mechanism is simplified by a fixed angular link rod 4 between the maneuver rod 6 in the actuator 7 and the valve 2.

The valve is in this example fitted with an internally extending projection 2a, said projection 2a having an approximate triangular cross section shape ending with a sharp or pointed edge.

Furthermore, a seal 11 is shown, extending around the side edge of the valve and ensuring a close-fitted installation towards the end of the pipe in the event of back-flow B.

The actuator 7 is in both embodiments preferably an electrical voice-coil linear motor, which is characterized by a considerable motion speed, the possibility for adjustment of said speed and finally, that it can provide the valve 2 with a vibrating motion, which has proved a highly efficient way to kill a rat, as the many successive blows guarantee an efficient and humane killing.

The projection 2a ensures, besides being an impact device, that the rat is trapped effectively during the killing and without possibility of escape.

Sensors, not shown, in the piping system will signal the actuator 7, when a rat 12 approaches, so that the valve 2 can start a slow down-swing for when the rat is in position to swing the valve down with great speed and force.

This has been found to give a high degree of accuracy and this, combined with the self-cleaning construction, results in the device being virtually maintenance-free and well-functioning as the device only uses simple and plain mechanical elements and which are placed outside the extent of the sewage water.

The invention claimed is:

1. Device comprising a combined non-return valve and rat killer for internal fitting in a piping system including a pipe, where the device comprises a swinging valve, which in a passive position is open in an up-swung position for continuous flow through the pipe and in an active position is closed in a down-swung position over a bottom end of the pipe, where the valve blocks back-flow, wherein the valve (2, 2a) is pivoted (8) at the top of the pipe (1) and connected to an automated actuator (7) with a reciprocating maneuver rod (6) for swinging the valve (2) between the passive position and the active position in response to signaling indicative of a sensed presence of a rat, and wherein the valve (2) on an inner side near a lower end of the valve is fitted with a projection (2a) with a cross section ending with a sharp or pointed edge to strike and kill or trap a rat sensed in the bottom end of the pipe when the valve is swung-down into the closed, active position after actuation of the valve into the active position is signaled to the automated actuator in the sensed presence of the rat.

2. Device according to claim 1, wherein the automated actuator (7) is signaled by at least one rat sensor to move to the active position.

3. Device according to claim 1, wherein the automated actuator (7) after each down-swinging of the valve (2, 2a) will raise it for free flow (A) through the pipe (1, 1a).

4. Device according to claim 1, wherein the automated actuator (7), in the event of power failure, will disconnect and thus ensure that the valve (2, 2a) can swing freely and thereby serve as a non-return valve.

5. Device comprising a combined non-return valve and rat killer for internal fitting in a piping system including a pipe, where the device comprises a swinging valve, which in a passive position is open for continuous flow through the pipe and in active position is in a down-swung position, where the valve blocks back-flow, wherein the valve (2, 2a) is pivoted (8) at the top of the pipe (1) and connected to an actuator (7) with a reciprocating maneuver rod (6) for swinging the valve (2) between an open and a closed position and wherein the valve (2) on an inner side near a lower end of the valve is fitted with a projection (2a) with a cross section ending with a sharp or pointed edge, wherein the actuator (7) is an electrically driven voice-coil linear motor, which can be set to a uniform motion speed, a variable motion speed, a vibrating motion, or any combination thereof.

6. Device according to claim 5, wherein the actuator (7), in the event of power failure, will disconnect and thus ensure that the valve (2, 2a) can swing freely and thereby serve as a non-return valve.

7. Device comprising a combined non-return valve and rat killer for internal fitting in a piping system including a pipe, where the device comprises a swinging valve, which in a passive position is open for continuous flow through the pipe and in active position is in a down-swung position, where the valve blocks back-flow, wherein the valve (2, 2a) is pivoted (8) at the top of the pipe (1) and connected to an actuator (7) with a reciprocating maneuver rod (6) for swinging the valve (2) between an open and a closed position and wherein the valve (2) on an inner side near a lower end of the valve is fitted with a projection (2a) with a cross section ending with a sharp or pointed edge, wherein the actuator (7) is controlled by at least one sensor in the pipe, and wherein a control is responsive to a signal from the sensor for providing a signal to the actuator (7) when a rat is sensed approaching to start a partial speed down-swinging of the valve (2, 2a) and when the rat is sensed in position to complete the down-swinging of the valve (2, 2a) with full speed and force to kill or trap the rat.

8. Device according to claim 7, wherein the actuator (7), in the event of power failure, will disconnect and thus ensure that the valve (2, 2a) can swing freely and thereby serve as a non-return valve.

\* \* \* \* \*